United States Patent
Pate et al.

(10) Patent No.: US 7,055,969 B2
(45) Date of Patent: Jun. 6, 2006

(54) REFLECTIVE OPTICAL ASSEMBLY

(75) Inventors: Michael A. Pate, Tucson, AZ (US); Guy Howard, Junction City, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 99 days.

(21) Appl. No.: 10/837,556

(22) Filed: Apr. 29, 2004

(65) Prior Publication Data
US 2005/0243300 A1    Nov. 3, 2005

(51) Int. Cl.
*G03B 21/28* (2006.01)

(52) U.S. Cl. .......................................... 353/99; 353/119

(58) Field of Classification Search .................. 353/98, 353/99, 119, 74, 77, 78; 345/5, 7, 8, 9
See application file for complete search history.

(56) References Cited

U.S. PATENT DOCUMENTS

| | | | |
|---|---|---|---|
| 4,647,166 A | 3/1987 | Franken et al. | |
| 4,875,064 A | 10/1989 | Umeda et al. | |
| 5,234,362 A * | 8/1993 | Breckenfeld et al. | 440/76 |
| 5,343,262 A | 8/1994 | Park | |
| 5,400,095 A | 3/1995 | Minich et al. | |
| 5,422,691 A | 6/1995 | Ninomiya et al. | |
| 5,491,585 A | 2/1996 | Dolgoff | |
| 5,570,213 A | 10/1996 | Ruiz et al. | |
| 5,669,688 A | 9/1997 | Baar et al. | |
| 5,791,754 A | 8/1998 | Cipolla et al. | |
| 5,795,049 A | 8/1998 | Gleckman | |
| 5,944,401 A | 8/1999 | Murakami et al. | |
| 6,166,787 A | 12/2000 | Akins et al. | |
| RE37,578 E | 3/2002 | Gleckman | |
| 6,478,429 B1 | 11/2002 | Aritake et al. | |
| 6,513,935 B1 * | 2/2003 | Ogawa | 353/37 |
| 6,527,397 B1 * | 3/2003 | Furuichi et al. | 353/119 |
| 6,561,652 B1 | 5/2003 | Kwok et al. | |
| 6,590,714 B1 | 7/2003 | Sugawara | |
| 6,601,959 B1 | 8/2003 | Miyata et al. | |
| 6,612,704 B1 * | 9/2003 | Ogawa | 353/99 |
| 6,626,542 B1 * | 9/2003 | Yamamoto et al. | 353/98 |
| 6,652,105 B1 | 11/2003 | Peterson et al. | |
| 6,712,475 B1 | 3/2004 | Davis et al. | |
| 6,805,447 B1 * | 10/2004 | Takeuchi | 353/71 |
| 6,808,268 B1 * | 10/2004 | Vrachan et al. | 353/10 |
| 6,877,862 B1 * | 4/2005 | Fukunaga et al. | 353/70 |
| 6,929,370 B1 * | 8/2005 | Kobayashi et al. | 353/99 |
| 2002/0024641 A1 | 2/2002 | Ilkov et al. | |
| 2002/0140912 A1 | 10/2002 | Cotton et al. | |
| 2002/0196413 A1 | 12/2002 | Kwok et al. | |
| 2003/0038924 A1 | 2/2003 | Veligdan et al. | |
| 2003/0039029 A1 | 2/2003 | Suzuki | |
| 2003/0067590 A1 | 4/2003 | Shin | |
| 2003/0128342 A1 | 7/2003 | Wada et al. | |
| 2003/0133079 A1 | 7/2003 | Cobb | |

(Continued)

OTHER PUBLICATIONS

European Search Report dated Jul. 19, 2005.

*Primary Examiner*—William C. Dowling

(57) ABSTRACT

In an implementation, a reflective optical assembly may be configured for translation from a portable position to an operational position. An image forming device may be configured to receive an input of an image and illumination input, provided by a light source, to generate an illuminated image output. The illuminated image output is reflected with the reflective optical assembly to direct the illuminated image output for display.

29 Claims, 6 Drawing Sheets

U.S. PATENT DOCUMENTS

| | | |
|---|---|---|
| 2003/0133084 A1 | 7/2003 | Brennesholtz |
| 2003/0184870 A1 | 10/2003 | Shioya |
| 2003/0202159 A1 | 10/2003 | Cobb et al. |
| 2003/0210380 A1 | 11/2003 | Westort et al. |
| 2003/0214634 A1 | 11/2003 | Akiyama |
| 2003/0218725 A1 | 11/2003 | Cotton et al. |
| 2004/0135976 A1* | 7/2004 | Ishihara et al. ............ 353/99 |
| 2004/0233398 A1* | 11/2004 | Konno et al. ............ 353/99 |
| 2005/0041220 A1* | 2/2005 | Sunaga ............ 353/99 |
| 2005/0110961 A1* | 5/2005 | Oross et al. ............ 353/119 |

* cited by examiner

REFLECTIVE OPTICAL ASSEMBLY

BACKGROUND

Projection systems are utilized in many aspects of modern life and provide a wide range of functionality to consumers. A projection system may be included in a projector to display images on a screen or other display device. A projection system may also be included in a rear-projection television or in a home theater system.

A projection system, such as a digital projector may be manufactured with refractive glass optical elements in the illumination and imaging systems of the projector. Glass optical elements may be heavy, formed from relatively expensive material, and expensive to fabricate. Further, refractive optics cause chromatic aberrations due to the dispersive nature of refractive optical materials.

BRIEF DESCRIPTION OF THE DRAWINGS

The same numbers are used throughout the drawings to reference like features and components.

DETAILED DESCRIPTION

The following describes embodiments of a reflective optical assembly. An embodiment of a projection device is described as an image forming device that includes an illumination branch and a projection path which is implemented as a reflective optical assembly. The illumination branch includes a light source and any number of various components to form an illuminated image for projection. The reflective optical assembly is formed with reflective optics that reflect and output the illuminated image for viewing. In one embodiment, the reflective optical assembly and the illumination branch can be translated from an operational position to a portable position with a collapsible support structure that positionaly-maintains the reflective optics and the illumination branch.

General reference is made herein to various embodiments of a reflective optical assembly in an exemplary environment of a projection device. Although specific examples of a reflective optical assembly may refer to particular implementations, aspects of a reflective optical assembly can be implemented in any environment that may utilize a projection system such as a front-projector in a home theater for display of a movie or television program, as a mobile and portable projector for display of a slide-show presentation in a business or classroom setting, as a movie projector for display of a movie in a movie theater, as a rear-projection television, and the like. Further, the examples are not meant to limit the scope of the claims or the description, but are meant to provide a specific understanding of an embodiment of a reflective optical assembly as described herein.

Figure 1:
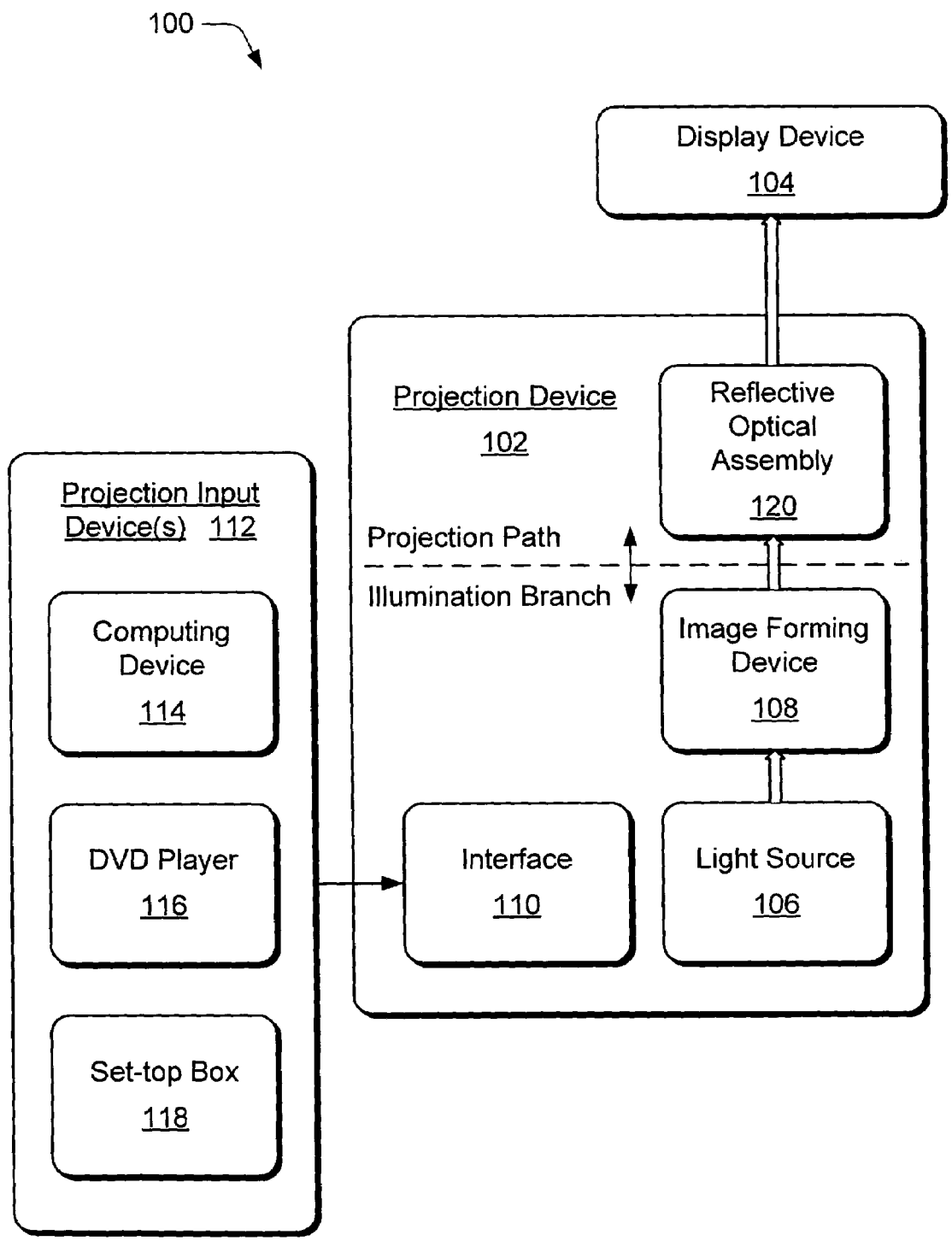
FIG. 1 illustrates an exemplary projection system in which embodiments of a reflective optical assembly can be implemented.

FIG. 1 illustrates an exemplary projection system 100 in which embodiments of a reflective optical assembly can be implemented. The projection system 100 includes a projection device 102 that generates an illumination output for display on a display device 104, such as a projection screen. The projection device 102 includes a light source 106 that supplies light which is used to provide the illumination output of the projection device 102. The light source 106 may be configured in a variety of ways, such as an arc halogen discharge lamp. Arc halogen discharge lamps ionize a gaseous vapor though a high-energy arc discharge between two electrodes. Other light sources may also be utilized, such as an incandescent light bulb, a fluorescent device, white-light emitting diodes, and so forth.

Light from the light source 106 is directed toward an image forming device 108 that generates an image using the light. The image forming device 108 may include any number of different components to generate the image. In one embodiment, the image forming device 108 is configured to perform digital light processing through the use of a digital micromirror device that includes a multitude of mirrors mounted onto a substrate. The mirrors of the digital micromirror device may be rotated individually which causes each of the mirrors to either reflect or not reflect light from the light source 106.

If a single digital micromirror device is utilized, red, green, and blue (RGB) portions of an image are shown in sequence to supply a colored image. For example, a color wheel that has red, green, and blue (RGB) segments may be utilized to supply the colors. The color wheel is placed between the light source 106 and the digital micromirror device and spun to provide red, green, or blue light depending on which segment of the color wheel is placed in a pathway of light output from the light source 106 to the digital micromirror device. Configuration of the mirrors is synchronized with the placement of the segments of the color wheel in the light path to provide sequential red, green, and blue images. By supplying the sequential images in rapid sequence, a full color image is perceived by the human eye. In another embodiment, multiple digital micromirror devices are utilized to form an image. For example, separate digital micromirror devices may be utilized to provide respective outputs of red, green and blue. Light reflected from each of the separate digital micromirror devices is combined to display a full color image.

The mirrors of a digital micromirror device may be configured in response to an input received via a projection device interface 110. Any number of different projection input devices 112 may generate an input to the interface 110, such as a computing device 114, a DVD player 116, a set-top box 118, and the like. For example, computing device 114 may provide an input that causes a slide show to be displayed on the display device 104 by the image forming device 108.

In another embodiment, the image forming device 108 is configured to include a liquid-crystal display (LCD) which may include a stationary mirror. Light from the light source 106 is transmitted through the LCD and reflected from the stationary mirror to generate an image. The LCD is utilized to control the light reflected from the stationary mirror by controlling transmission of red, green, and/or blue light at each pixel of the LCD. Like the mirrors of a digital micromirror device, each pixel of the LCD may be configured in response to an input received via the projection device interface 110. Alternatively, the image forming device 108 may be implemented with a grating light valve (GLV) or a liquid crystal on silicon (LCOS) device.

Although projection device 102 is shown with the light source 106 and the image forming device 108 as separate components, any number of different components may be added, combined, and/or deleted in various embodiments to implement the light source 106 and/or the image forming device 108. For example, the image forming device 108 may be configured as a cathode-ray tube (CRT) that includes a cathode, two or more anodes, and a phosphor coated screen from which light is output. Alternatively, the image forming device may be configured to include a color wheel, an illuminating rod, lenses, and/or a light valve. The light source 106 and the image forming device 108 may also be referred to as the "illumination branch" of the projection device 102.

In an embodiment, the light is directed (i.e., transmitted, emitted, and/or reflected) by the image forming device 108 to a reflective optical assembly 120 that reflects the formed image as an illuminated image output on the display device 104 for viewing. The reflective optical assembly 120 may also be referred to as the "projection path" of the projection device 102. The projection device 102 is only one of any number of projection device configurations and components that can be implemented in any number of projection systems to display an illuminated image output on a display device 104.

Figure 2:
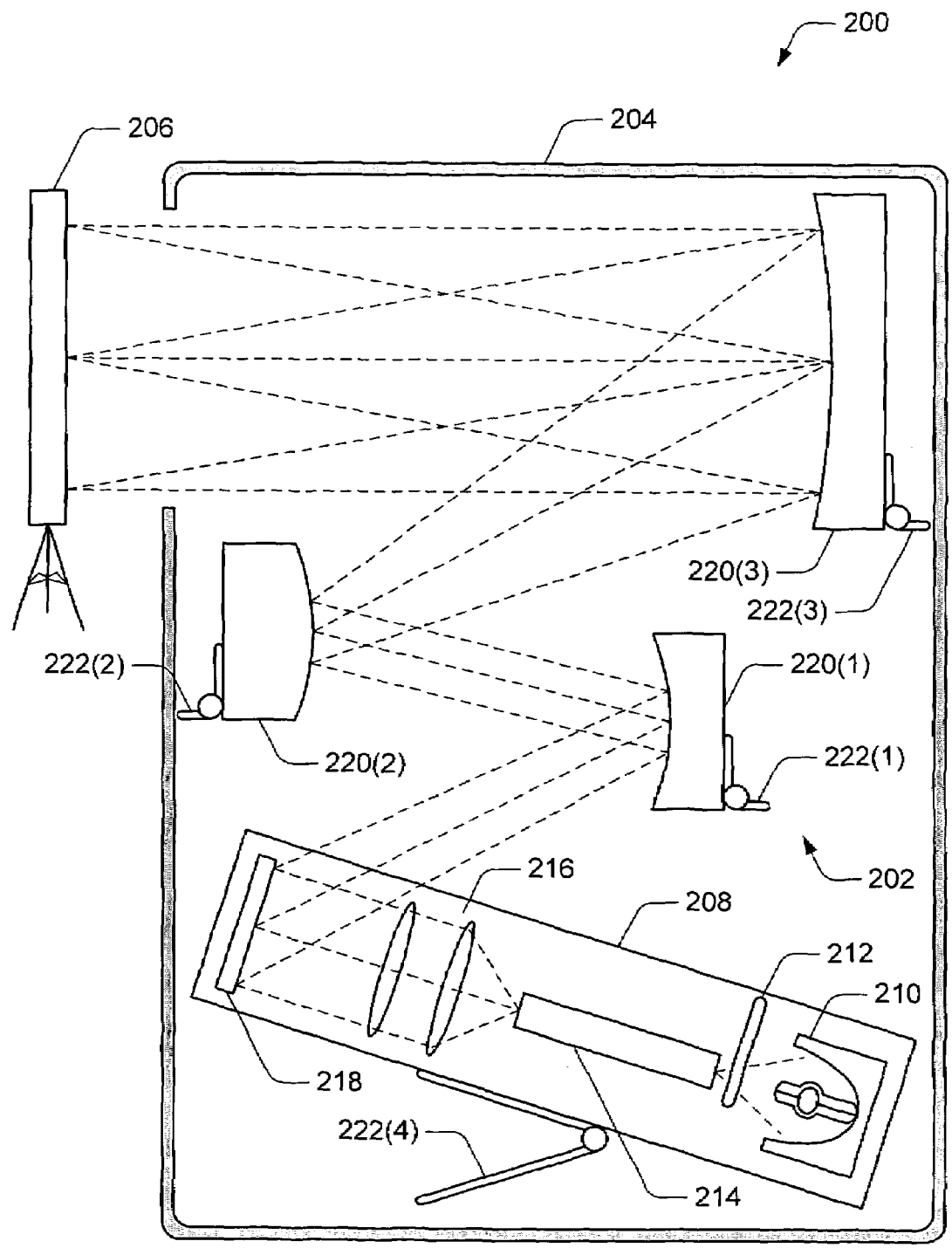
FIG. 2 illustrates an exemplary projection system that includes an embodiment of a reflective optical assembly.

FIG. 2 illustrates an exemplary projection system 200 in which an embodiment of a reflective optical assembly 202 is implemented. The reflective optical assembly 202 is one example of the reflective optical assembly 120 in the projection path of the projection device 102 shown in FIG. 1. The example projection system 200 includes a projection device 204 and a display device 206.

The projection device 204 includes the reflective optical assembly 202 and an illumination branch 208 which has a light source 210 and various image forming devices. In this example, the image forming devices include a color wheel 212, an illuminating rod 214, one or more lenses 216, and a light valve 218. As described above with reference to the image forming device 108 of projection device 102 (FIG. 1), the image forming devices of the illumination branch 208 may be implemented with any number of different components in various embodiments.

The illumination branch 208 forms an image that is reflected by the reflective optical assembly 202 as an illuminated image output on the display device 206 for viewing. The reflective optical assembly 202 includes reflective optics 220(1–3) that are each designed and positioned to image the object 218 illuminated by the illumination branch 208 onto the display device 206. In addition, the reflective optical assembly 202 images the object illuminated by the illumination branch 208 onto the display device 206 without the use of a lens. Because there are no lenses in the projection path (e.g., the reflective optical assembly 202), there is no index of refraction or significant chromatic aberrations as with glass lenses, and the focal length for the reflected image is the same for all wave lengths.

The reflective optics 220(1–3) can each be manufactured as mirrors, for example, which do not cause significant chromatic aberrations and which are more efficient than glass and refractive optical materials for optical transmission. The reflective optics 220(1–3) can be formed with a reflective material formed over a plastic or polymer substrate which is light weight and less expensive than glass or metal. In an embodiment, reflective optics 220(1) and 220(2) can be implemented as mirrors, and reflective optic 220(3) can be implemented as a micro-mirror array.

Each of the reflective optics 220(1–3) and the illumination branch 208 are supported in the projection device 204 with articulated supports 222(1–4), respectively. The articulated supports 222(1–4) allow the reflective optics 220(1–3) and the illumination branch 208 to be folded such that projection device 204 is collapsible, compact, light weight, and portable. For example, projection device 204 may be configured as a thin, two to three pound portable device for use by a traveling business person having a need to carry the device from cars, onto airplanes, to meetings, and the like.

Figure 3:
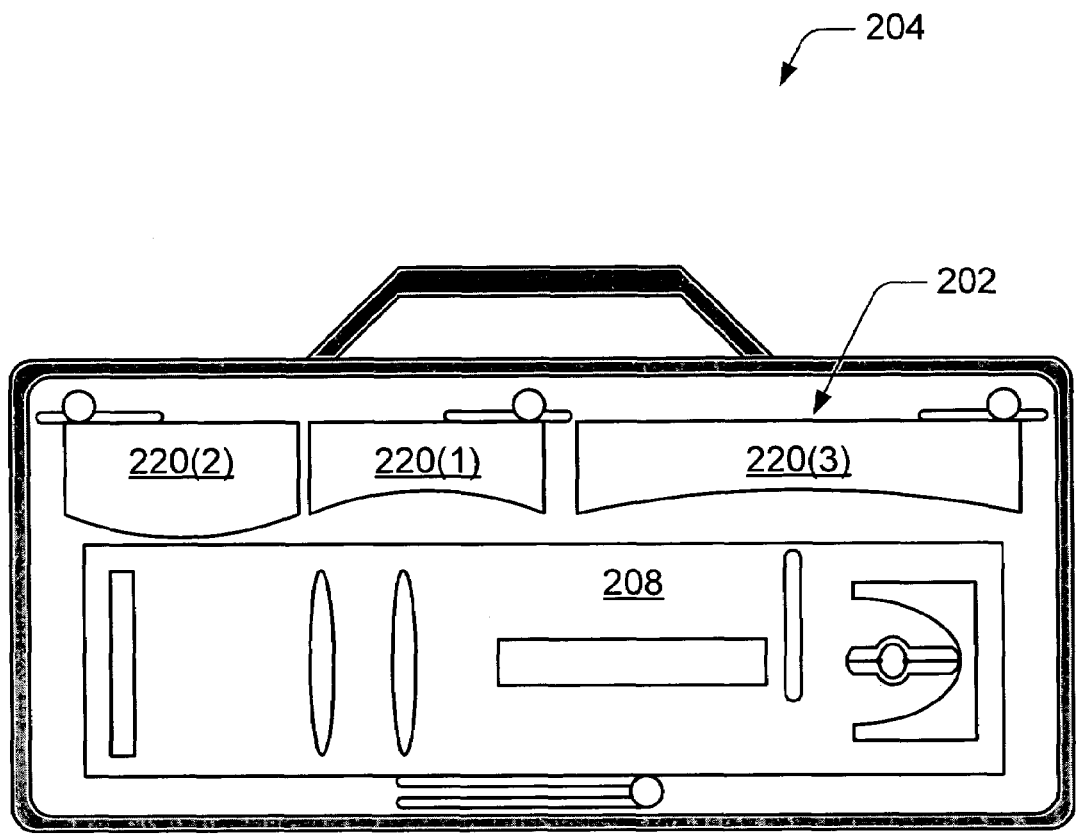
FIG. 3 illustrates an embodiment of a portable configuration of the exemplary projection system shown in FIG. 2.

FIG. 3 illustrates an example of projection device 204 configured for portability. The illumination branch 208, as well as the reflective optics 220(1–3) of the reflective optical assembly 202, are collapsed down such that the projection device 204 is compact and portable. For example, projection device 204 may be collapsed down to only a few inches in height and compact for easy transport, such as with a laptop computer.

The depiction of projection device 204 in FIG. 3 is merely illustrative to show the components of projection device 204 in a portable configuration. In practice, projection device 204 may include any form of an integrated collapsible support structure to store or position the components of projection device 204 for portability. Further, the reflective optics 220(1–3) of the reflective optical assembly 202 can be translated from a portable position as shown in FIG. 3 to an operational position as shown in FIG. 2.

Figure 4:
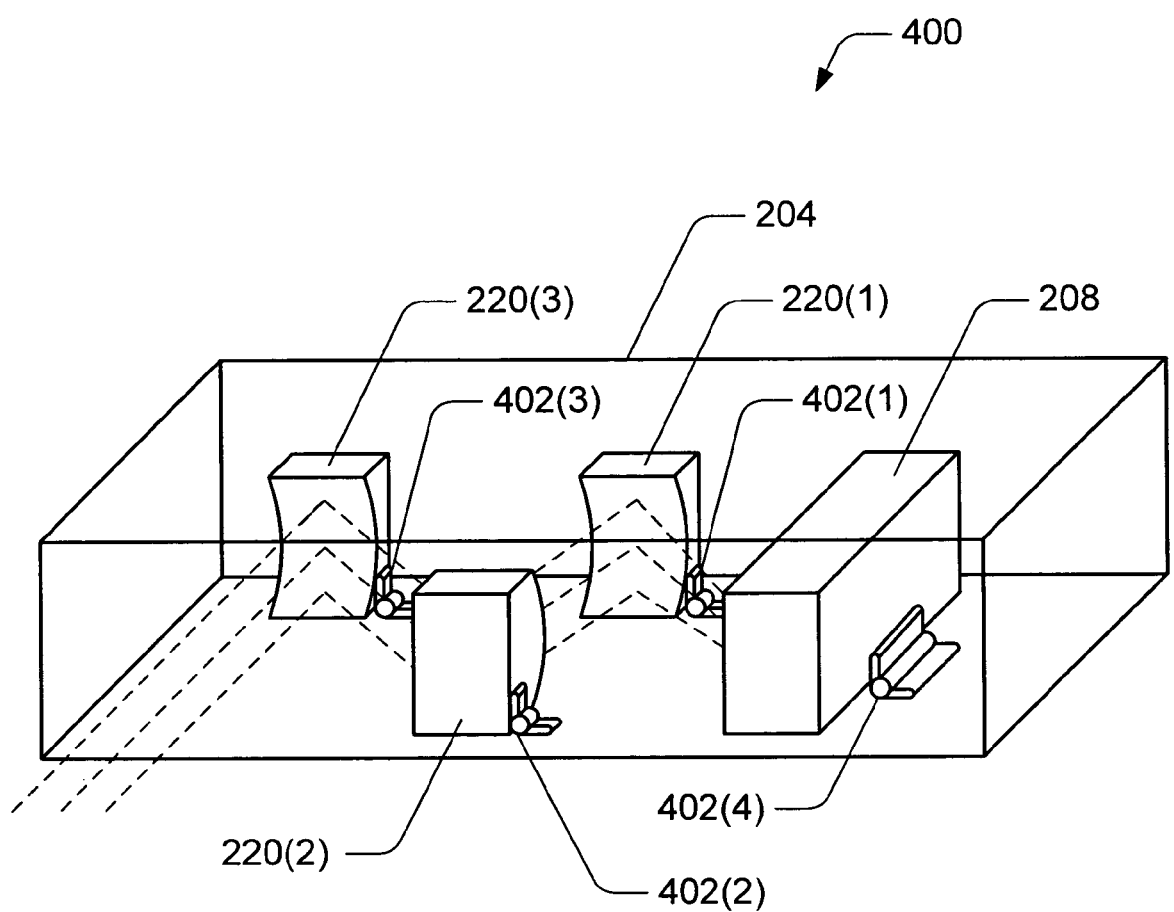
FIG. 4 illustrates an embodiment of a configuration of the exemplary projection system shown in FIG. 2.

FIG. 4 illustrates another example configuration 400 of projection device 204 (shown transparent in this example). Each of the reflective optics 220(1–3) and the illumination branch 208 are supported in the projection device 204 with articulated supports 402(1–4), respectively. The articulated supports 402(1–4) allow the reflective optics 220(1–3) and the illumination branch 208 to each fold or collapse down onto a base of the projection device 204 such that projection device is collapsible, compact, light weight, and portable. The depiction of projection device 204 in FIG. 4 is merely illustrative to show the components of projection device 204 in an operational configuration, and to illustrate one example support structure for a portable configuration of the projection device 204. In practice, projection device 204 may include any form of an integrated collapsible support structure to store or position the components of projection device 204 for portability.

Figure 5:
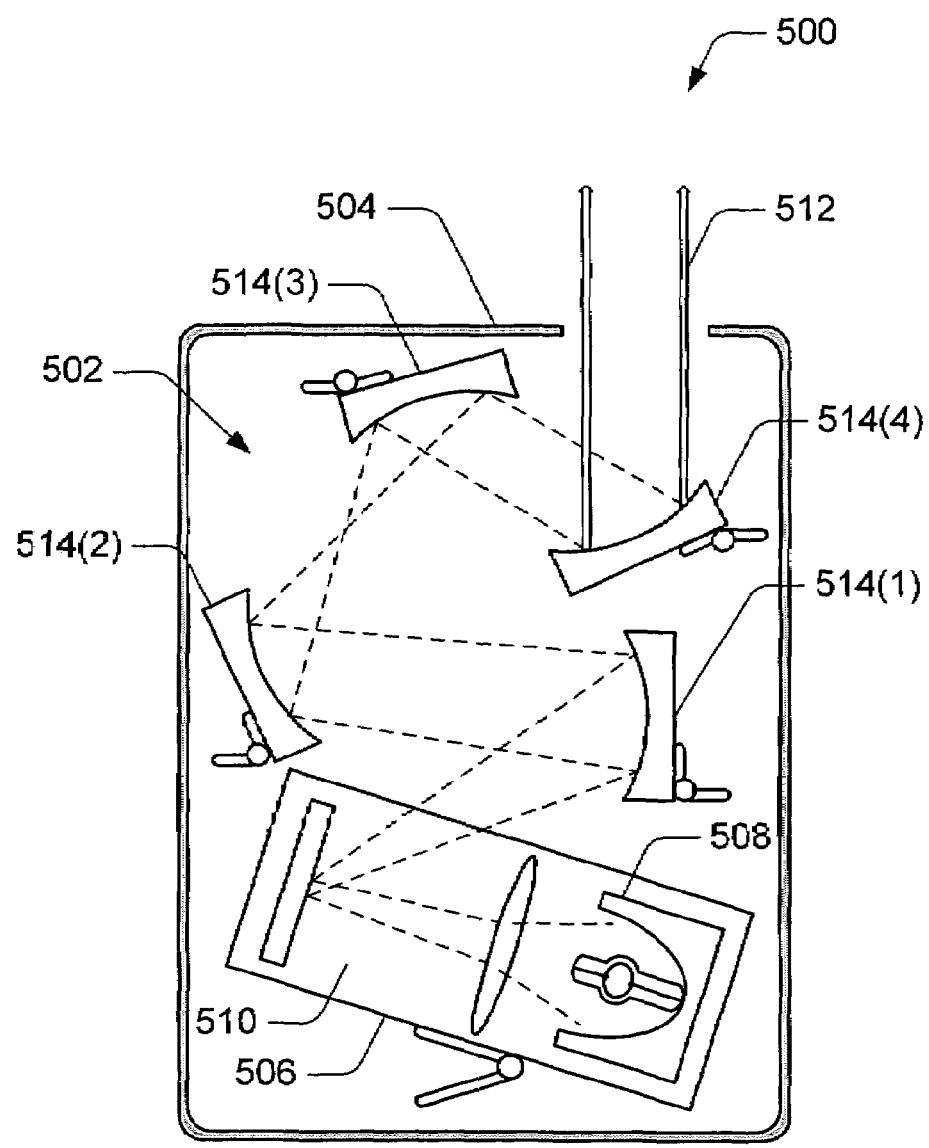
FIG. 5 illustrates an exemplary projection system that includes an embodiment of a reflective optical assembly.

FIG. 5 illustrates another exemplary projection system 500 in which an embodiment of a reflective optical assembly 502 is implemented. The reflective optical assembly 502 is one example of the reflective optical assembly 120 in the projection path of the projection device 102 shown in FIG. 1. The example projection system 500 includes a projection device 504.

The projection device 504 includes the reflective optical assembly 502 and an illumination branch 506 which has a light source 508 and various image forming devices 510, such as one or more lenses and a light valve. As described above with reference to the image forming device 108 of projection device 102 (FIG. 1), the image forming devices of the illumination branch 506 may be implemented with any number of different components in various embodiments.

The illumination branch 506 forms an image that is reflected by the reflective optical assembly 502 as an illuminated image output 512 which can be displayed for viewing on a display device. The reflective optical assembly 502 includes reflective optics 514(1–4) that are each designed and positioned to reflect the image formed by the illumination branch 506 as the illuminated image output 512. In addition, the reflective optical assembly 502 reflects the image formed by the illumination branch 506 without incorporating a lens. Because there are no lenses in the projection path (e.g., the reflective optical assembly 502), there is no index of refraction or significant chromatic aberrations as with glass lenses, and the focal length for the reflected image is substantially the same for all wave lengths.

The reflective optics 514(1–3) can each be manufactured as mirrors, for example, with a reflective material formed over a plastic or polymer substrate which is light weight and inexpensive. In an embodiment, reflective optics 514(1–3) can be implemented as powered mirrors and reflective optic 514(4) can be implemented as a plano mirror that folds the reflected illuminated image.

As described above with reference to projection device 204 (FIGS. 2–4), each of the reflective optics 514(1–4) and the illumination branch 506 can be supported in the projection device 504 with an implementation of articulated supports and/or in combination with any form of an integrated collapsible support structure to store or position the components for portability. The projection device 504 can be designed such that it is collapsible, compact, light weight, and portable. Further, the projection device 504 can be designed for very small devices, such as a PDA, a handheld game display, and the like.

Figure 6:
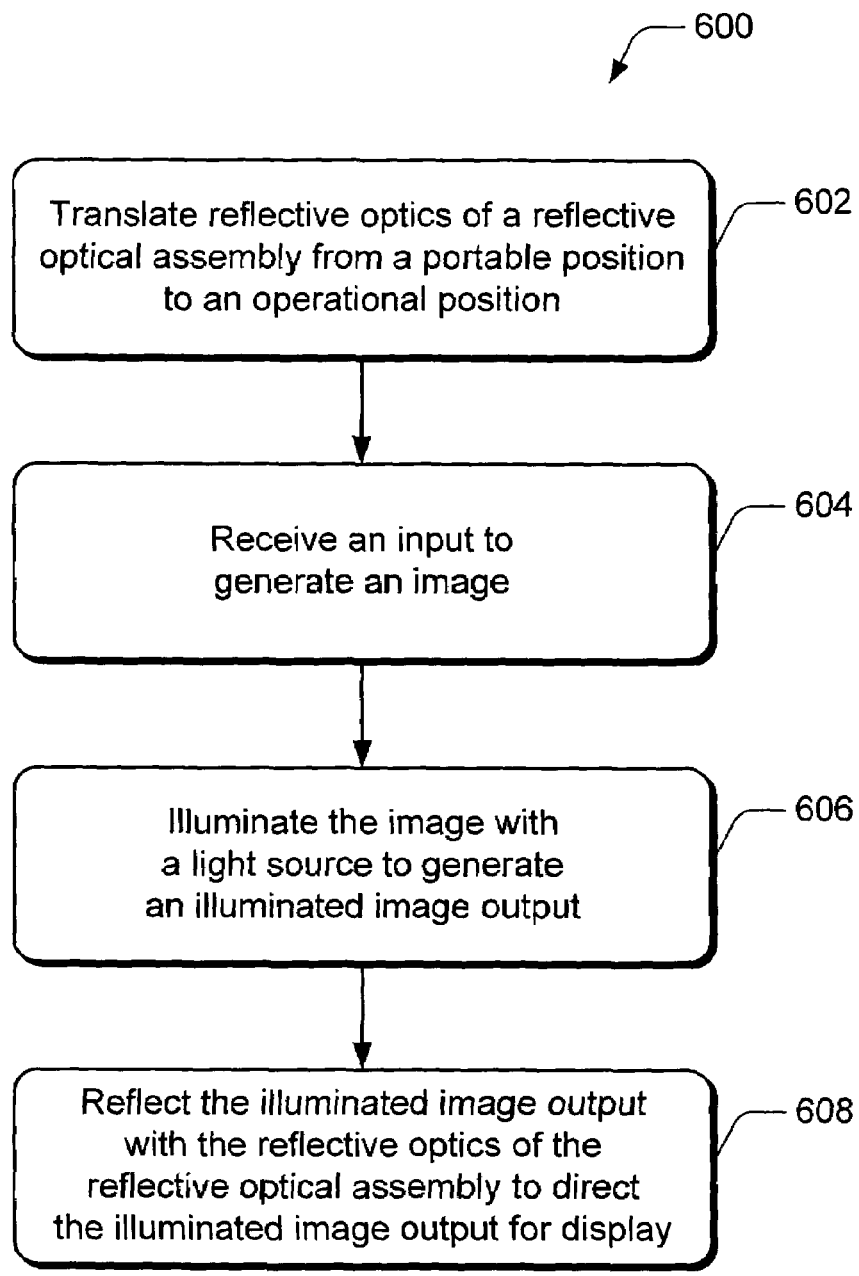
FIG. 6 is a flow diagram that illustrates an embodiment of a method for a reflective optical assembly.

FIG. 6 illustrates an embodiment of a method 600 for a reflective optical assembly. The order in which the method is described is not intended to be construed as a limitation, and any number of the described method blocks may be combined in any order to implement the method.

At block 602, reflective optics of a reflective optical assembly are translated from a portable position to an operational position. For example, reflective optics 220(1–3) of the reflective optical assembly 202 can be translated from a portable position as shown in FIG. 3 to an operational position as shown in FIG. 2. The reflective optics 220(1–3) can be re-positioned with a collapsible support structure 222(1–4) (FIG. 2) and/or 402(1–4) (FIG. 4) that positionaly-maintains the reflective optics 220(1–3) within projection device 204.

At block 604, an input is received to generate an image. For example, projection device 102 (FIG. 1) can receive an input via the projection device interface 110 from any number of different projection input devices 112, such as a computing device 114, a DVD player 116, a set-top box 118, and the like. At block 606, the image is illuminated with a light source to generate an illuminated image output. For example, light source 210 of the illumination branch 208 provides the illumination to generate an illuminated image output of the illumination branch 208.

At block 608, the illuminated image output is reflected with the reflective optics of the reflective optical assembly to direct the illuminated image output for display. For example, the reflective optics 220(1–3) of the reflective optical assembly 202 reflect the illuminated image output of the illumination branch 208 for display on display device 206. The first reflective optic 220(1) reflects the illuminated image output from the image forming device 208. The second reflective optic 220(2) reflects the first reflective optic reflection of the illuminated image output, and the third reflective optic 220(3) reflects the second reflective optic reflection of the illuminated image output to direct the illuminated image output for display.

Although embodiments of a reflective optical assembly have been described in language specific to structural features and/or methods, it is to be understood that the subject of the appended claims is not necessarily limited to the specific features or methods described. Rather, the specific features and methods are disclosed as exemplary implementations of a reflective optical assembly.

The invention claimed is:

1. A projection system, comprising:
   a light source configured to provide illumination;
   an image forming device configured to receive an input of an image and the illumination to generate an illuminated image output; and
   a reflective optical assembly configured for translation from a portable position to an operational position, the reflective optical assembly further configured to reflect the illuminated image output with reflective optics including a digital micro-mirror array to direct the illuminated image output for display.

2. A projection system as recited in claim 1, wherein the reflective optical assembly includes the reflective optics formed with reflective material over a plastic substrate, the reflective material configured to reflect the illuminated image output.

3. A projection system as recited in claim 1, wherein the reflective optical assembly includes the reflective optics formed with reflective material over a polymer substrate, the reflective material configured to reflect the illuminated image output.

4. A projection system as recited in claim 1, further comprising a collapsible support structure configured to positionaly-maintain the reflective optics and translate the reflective optics from the operational position to the portable position.

5. A projection system as recited in claim 1, further comprising a collapsible support structure configured to positionaly-maintain the light source, the image forming device, and the reflective optics, the collapsible support structure further configured to translate the light source, the image forming device, and the reflective optics from the operational position to the portable position.

6. A projection system as recited in claim 1, wherein the reflective optical assembly includes:
   a first reflective optic configured to reflect the illuminated image output from the image forming device as a first reflection;
   a second reflective optic configured to reflect the first reflection of the illuminated image output as a second reflection; and
   a third reflective optic configured to reflect the second reflection of the illuminated image output and direct the illuminated image output for display.

7. A projection system as recited in claim 1, wherein the reflective optical assembly includes:
   a first mirror configured to reflect the illuminated image output from the image forming device as a first reflection;
   a second mirror configured to reflect the first reflection of the illuminated image output as a second reflection; and
   a micro-mirror array configured to reflect the second reflection of the illuminated image output and direct the illuminated image output for display.

8. A projection system as recited in claim 1, wherein the reflective optical assembly includes:
   a first powered mirror configured to reflect the illuminated image output from the image forming device as a first reflection;
   a second powered mirror configured to reflect the first reflection of the illuminated image output as a second reflection;

a third powered mirror configured to reflect the second reflection of the illuminated image output as a third reflection; and a plano mirror configured to fold and reflect the third reflection of the illuminated image output to direct the illuminated image output for display.

9. A projection system, comprising:

a light source configured to provide illumination;

an image forming device configured to receive an input of an object and the illumination to generate an illuminated object output; and a reflective optical assembly configured for translation from a portable position to an operational position, the reflective optical assembly further configured to reflect the illuminated object output with reflective optics including a digital micro-mirror array to direct the illuminated object output for display.

10. A projection system as recited in claim 9, wherein the reflective optical assembly includes the reflective optics formed with reflective material over a plastic substrate, the reflective material configured to reflect the illuminated object output.

11. A projection system as recited in claim 9, wherein the reflective optical assembly includes:

a first reflective optic configured to reflect the illuminated object output from the image forming device as a first reflection;

a second reflective optic configured to reflect the first reflection of the illuminated object output as a second reflection; and a third reflective optic configured to reflect the second reflection of the illuminated object output and direct the illuminated object output for display.

12. A reflective optical assembly, comprising:

a first reflective optic configured to reflect an illuminated image output of an image forming device as a first reflection;

a second reflective optic configured to reflect the first reflection of the illuminated image output as a second reflection;

a third reflective optic configured to reflect the second reflection of the illuminated image output with a digital micro-mirror array and direct the illuminated image output for display; and a collapsible support structure configured to positionaly-maintain the reflective optics and translate the reflective optics from an operational position to a portable position.

13. A reflective optical assembly as recited in claim 12, wherein the first reflective optic is a mirror, the second reflective optic is a mirror, and the third reflective optic is a micro-mirror array.

14. A reflective optical assembly as recited in claim 12, wherein the first reflective optic is a powered mirror, the second reflective optic is a powered mirror, and the third reflective optic is a plano mirror configured to fold and reflect the second reflective optic reflection of the illuminated image output.

15. A reflective optical assembly as recited in claim 12, wherein the image forming device includes the only one or more lenses of the projector system.

16. A reflective optical assembly as recited in claim 12, wherein the reflective optics are each formed with reflective material over a plastic substrate, the reflective material configured to reflect the illuminated image output.

17. A reflective optical assembly as recited in claim 12, wherein the reflective optics are each formed with reflective material over a polymer substrate, the reflective material configured to reflect the illuminated image output.

18. A reflective optical assembly as recited in claim 12, wherein the collapsible support structure is further configured to positionaly-maintain the image forming device and translate the image forming device from the operational position to the portable position.

19. A reflective optical assembly, comprising:

a first reflective optic configured to reflect an illuminated object output of an image forming device as a first reflection;

a second reflective optic configured to reflect the first reflection of the illuminated object output as a second reflection;

a third reflective optic configured to reflect the second reflection of the illuminated object output with a digital micro-mirror array and direct the illuminated image output for display; and a collapsible support structure configured to positionaly-maintain the reflective optics and translate the reflective optics from an operational position to a portable position.

20. A reflective optical assembly as recited in claim 19, wherein the reflective optics are each formed with reflective material over a plastic substrate, the reflective material configured to reflect the illuminated object output.

21. A reflective optical assembly as recited in claim 19, wherein the reflective optics are each formed with reflective material over a polymer substrate, the reflective material configured to reflect the illuminated object output.

22. A method, comprising:

translating reflective optics of a reflective optical assembly from a portable position to an operational position;

receiving an input to generate an image;

illuminating the image with a light source to generate an illuminated image output; and reflecting the illuminated image output with the reflective optics of the reflective optical assembly including a digital micro-mirror array to direct the illuminated image output for display.

23. A method as recited in claim 22, wherein the reflective optics are translated from the portable position to the operational position with a collapsible support structure that positionaly-maintains the reflective optics.

24. A method as recited in claim 22, wherein reflecting the illuminated image output includes:

reflecting the illuminated image output from an image forming device with a first reflective optic as a first reflection;

reflecting the first reflection of the illuminated image output with a second reflective optic as a second reflection; and reflecting the second reflection of the illuminated image output with a third reflective output to direct the illuminated image output for display.

25. A method as recited in claim 22, wherein reflecting the illuminated image output includes:

reflecting the illuminated image output from an image forming device with a first mirror as a first reflection;

reflecting the first reflection of the illuminated image output with a second mirror as a second reflection; and reflecting the second reflection of the illuminated image output with a third mirror to direct the illuminated image output for display.

26. A method as recited in claim 22, wherein reflecting the illuminated image output includes:

reflecting the illuminated image output from an image forming device with a first mirror as a first reflection;
reflecting the first reflection of the illuminated image output with a second mirror as a second reflection; and
reflecting the second reflection of the illuminated image output with a micro-mirror array to direct the illuminated image output for display.

27. A method as recited in claim 22, wherein reflecting the illuminated image output includes:
reflecting the illuminated image output from an image forming device with a first powered mirror as a first reflection;
reflecting the first reflection of the illuminated image output with a second powered mirror as a second reflection;
reflecting the second reflection of the illuminated image output with a third powered mirror as a third reflection; and
reflecting the third reflection of the illuminated image output with a plano mirror to fold and reflect the third reflection to direct the illuminated image output for display.

28. A projection device, comprising:
means to receive an input to generate an image;
means to illuminate the image to generate an illuminated image output; and
means to reflect the illuminated image output with reflective optics of a reflective optical assembly having a portable position and including a digital micro-mirror array to direct the illuminated image output for display.

29. A projection device as recited in claim 28, further comprising means to translate the reflective optics of the reflective optical assembly from the portable position to the operational position.

* * * * *